(12) United States Patent
Zhou et al.

(10) Patent No.: US 11,061,194 B2
(45) Date of Patent: Jul. 13, 2021

(54) OPTICAL MODULE UNLOCKING DEVICE AND OPTICAL MODULE

(71) Applicant: Wuhan Telecommunication Devices Company, Hubei (CN)

(72) Inventors: Yun Zhou, Hubei (CN); Benqing Quan, Hubei (CN); Yubang Sheng, Hubei (CN); Yufei Wang, Hubei (CN); Sijia Yu, Hubei (CN)

(73) Assignee: Wuhan Telecommunication Devices Company

( * ) Notice: Subject to any disclaimer, the term of this patent is extended or adjusted under 35 U.S.C. 154(b) by 0 days.

(21) Appl. No.: 16/811,520

(22) Filed: Mar. 6, 2020

(65) Prior Publication Data

US 2020/0278510 A1 Sep. 3, 2020

(30) Foreign Application Priority Data

Jan. 9, 2019 (CN) .......................... 201910021084.X (51) Int. Cl.
  *G02B 6/42* (2006.01)
  *H01R 13/633* (2006.01)
  (Continued)

(52) U.S. Cl.
  CPC .......... *G02B 6/4261* (2013.01); *G02B 6/428* (2013.01); *G02B 6/4284* (2013.01);
  (Continued)

(58) Field of Classification Search
  CPC .... G02B 6/4261; G02B 6/428; G02B 6/4284; G02B 6/4439; H01R 13/635; H01R 13/6335
  See application file for complete search history.

(56) References Cited

U.S. PATENT DOCUMENTS 7,473,124 B1 *  1/2009  Briant ................ H01R 13/6275
                                                       439/352
8,550,848 B2 * 10/2013  Wu .................... H01R 13/6583
                                                       439/607.18
(Continued)

FOREIGN PATENT DOCUMENTS

CN    201464679 U    5/2010
CN    105652392 A    6/2016
CN    108802920 A    11/2018

OTHER PUBLICATIONS

Chinese Search Report for Application No. 201910021084.X, dated Mar. 13, 2020, pp. 1-2.

*Primary Examiner* — Ryan A Lepisto
(74) *Attorney, Agent, or Firm* — Lerner, David, Littenberg, Krumholz & Mentlik, LLP (57) ABSTRACT

Disclosed are an optical module unlocking device and an optical module. For the optical module unlocking device, a boss is arranged on a metal front end of a pull ring. The boss abuts against the skewed slot of an upper cover. The metal front end located in the upper cover can slide relatively along the limiting post of the upper cover and at least one boss is driven to slide into the skewed slot of the upper cover and then hide into the bottom of the skewed slot or abut against a bevel edge of the at least one skewed slot and then bulge. After the at least one boss abuts against the bevel edge of the at least one skewed slot and then bulges, a shielding cage spring strip which is about to be cooperated with the boss is opened by being pushed upwards, and the optical module can be unlocked. The reliability of the optical module unlocking device is high and the unlocking motion of the optical module is simple. The optical module unlocking device of the present disclosure has the advantages of less component quantities, simple assembling, high assembling efficiency and low cost.

19 Claims, 9 Drawing Sheets

(51) Int. Cl.
     *G02B 6/44* (2006.01)
     *H01R 13/635* (2006.01)
(52) U.S. Cl.
     CPC .......... *G02B 6/4439* (2013.01); *H01R 13/635* (2013.01); *H01R 13/6335* (2013.01)

(56) References Cited

U.S. PATENT DOCUMENTS

| | | | | |
|---|---|---|---|---|
| 8,562,373 | B2* | 10/2013 | Wu ................... | H01R 13/6658 439/352 |
| 8,740,637 | B2* | 6/2014 | Wang ................ | H01R 13/6335 439/352 |
| 8,787,025 | B2* | 7/2014 | Wu ................... | H01R 13/6335 361/740 |
| 8,814,229 | B2* | 8/2014 | Togami .............. | G02B 6/4284 292/219 |
| 10,270,209 | B2* | 4/2019 | Resendez ........... | H01R 13/508 |

* cited by examiner

OPTICAL MODULE UNLOCKING DEVICE AND OPTICAL MODULE

PRIORITY

This application claims priority under U.S.C. 119(a) to Chinese Application Serial No. 201910021084.X, which was filed in the China National Intellectual Property Administration on Jan. 9, 2019, the entire content of which is incorporated herein by reference.

TECHNICAL FIELD OF THE DISCLOSURE

The present disclosure relates to the field of optical module structure, and in particular, to an optical module unlocking device and an optical module.

BACKGROUND

In the era of big data, more and more high-density and high-bandwidth applications are applied. As a result, passive optical cables or copper wire-based cable systems are not enough. In order to ensure the stable transmission and flexible applicability, a new product is urgently needed to be used as a main transmission medium for high-performance computing and data centers. An active optical cable (AOC) is a communication cable that converts electrical signals to optical signals or converts optical signals into electrical signals during communication with the help of external energy. Optical transceivers at both ends of the active optical cable provide photoelectric conversion and optical transmission functions.

The active optical cable AOC, which is composed of integrated optoelectronic devices, is a transmission device performing high-speed and high-reliability interconnection among equipment such as data centers, high-performance computers, and large-capacity storage devices and the like, and transmits data through an internal electro-optical-electrical conversion by using the superiority of the optical cable.

The active optical cable has following characteristics, such as lower power consumption, small volume, light weight and well-heat-spread etc., and its transmission distance can be up to 100-300 m or more, and its transmission performance is better compared with those of the copper cable. Compared with an optical transceiver module, the active optical cable does not have the problem that an optical interface is polluted due to the non-exposed optical interface, thus greatly improving the stability and reliability of the system and reducing the management cost of equipment room.

Currently, there are mainly two manners for unlocking an SFP+AOC optical module:

The first is that a handle with a plastic bump is placed under a metal unlocking device of the SFP+AOC optical module. When the handle is pulled, the plastic bump pushes the unlocking device upwards, and a lock catch of a shielding cage is pushed and opened to make the SFP+AOC optical module be unlocked;

The second is that an unlocking device of the SFP+AOC optical module and a handle are an integrated plastic part. When the handle is pulled, the plastic unlocking device deforms upwards, and the lock catch of the shielding cage is pushed and opened to make the SFP+AOC optical module be unlocked.

The plastic parts are the key stressed parts in these two unlocking manners when unlocking, as plastics are certain long-chain polymers and start chemical reactions due to high temperature, light, oil, etc. which makes their composition change, their long chains break, their original characteristics disappear, and their aging occur. After the physical and mechanical properties of the plastic parts are reduced, as the stressed parts at key position, they cannot meet the usage function requirement thereof, which greatly reduces the reliability of SFP+AOC optical modules when used. If the SFP+AOC optical module cannot be unlocked due to the breakage of the plastic parts, it will cause severe failure in engineering applications.

In view of this, overcoming the defects existing in the prior art is an urgent problem to be solved in this technical field.

SUMMARY

The technical problem to be solved by the present disclosure is that the use reliability of the optical module is reduced due to the aged plastic parts which serve as the key parts in the existing optical module unlocking device and even that the optical module cannot be unlocked due to the breakage of the plastic parts.

The present disclosure adopts the following technical solutions:

In a first aspect, the present disclosure provides an optical module unlocking device, comprising a pull ring and an upper cover, wherein the pull ring has a metal front end which is provided with at least one boss, and the upper cover includes a limiting post and at least one skewed slot; wherein the metal front end of the pull ring is arranged in the upper cover and is coupled to the limiting post, and the at least one boss of the metal front end abuts against the at least one skewed slot; and wherein the metal front end is able to slide in the upper cover along the limiting post, driving the at least one boss to slide into the at least one skewed slot and then hide into a bottom of the at least one skewed slot, or abut against at least one bevel edge of the at least one skewed slot and then bulge.

In an embodiment of the present disclosure, the at least one boss of the metal front end each has at least one unlocking arm and at least one bump, and the skewed slot has at least one groove being consistent with the at least one bump and the at least one unlocking arm in number; when the at least one boss hides into the bottom of the at least one skewed slot, the at least one bump is coupled to the at least one groove of the skewed slot.

In an embodiment of the present disclosure, when a bulge height of the at least boss after abutting against the bevel edge of the at least one skewed slot and bulging is higher than a certain height, the optical module unlocking device is unlocked. In particular, when the bulge height of the at least one boss is higher than a height of an upper surface of a projection of the upper cover, the optical module unlocking device is unlocked.

In an embodiment of the present disclosure, when the at least one unlocking arm is below a height of a lower surface of the projection of the upper cover, the optical module unlocking device is locked.

In an embodiment of the present disclosure, the optical module unlocking device further includes a snap-in cover, and the upper cover further includes at least one sticking point, and the snap-in cover includes at least one catching nut which may be coupled to the at least one sticking point and matches the at least one sticking point in number.

In an embodiment of the present disclosure, the snap-in cover is further provided with a through-hole, via which the snap-in cover is connected with the limiting post by a threaded connection.

In an embodiment of the present disclosure, the optical module unlocking device further comprises a snap-in cover which is provided with a through-hole, and the snap-in cover is connected with the limiting post by a threaded connection via the through-hole.

In an embodiment of the present disclosure, the snap-in cover is further provided with a tab which abuts against a connecting arm of the pull ring connecting to the at least one boss.

In an embodiment of the present disclosure, the upper cover further comprises two platforms, and the metal front end is provided with two stopping arms which are respectively coupled to the platforms.

In an embodiment of the present disclosure, the metal front end is provided with an oval hole coupled to the limiting post, and the metal front end may slide along a length direction of the oval hole.

In an embodiment of the present disclosure, a width of the oval hole is the same as that of the limiting post.

In an embodiment of the present disclosure, the optical module unlocking device further comprises a torsion spring having an annular ring and two L-shaped arms; the pull ring further includes two vertical arms respectively provided with U-shaped holes; the upper cover further includes two stopping surfaces; the annular ring is coupled to the limiting post of the upper cover, the two L-shaped arms respectively pass through the corresponding U-shaped holes of the vertical arms, and the two vertical arms respectively abut against the two stopping surfaces.

In an embodiment of the present disclosure, the optical module unlocking device further comprises a torsion spring having an annular ring and two L-shaped arms; the pull ring further includes two vertical arms respectively provided with U-shaped holes and two stopping arms respectively provided on outsides of the two vertical arms; the upper cover further includes two stopping surfaces; the annular ring is coupled to the limiting post of the upper cover, the two L-shaped arms respectively pass through the corresponding U-shaped holes of the vertical arms, and the two stopping arms respectively abut against the two stopping surfaces.

In a second aspect, the present disclosure also provides an optical module, comprising an optical module unlocking device, a base, and an optical module elastic strip, the optical module unlocking device being coupled to the base, the optical module elastic strip being disposed on an assembly of the optical module unlocking device and the base; the optical module unlocking device including a pull ring and an upper cover; the pull ring having a metal front end, the metal front end being provided with at least one boss; the upper cover having a limiting post and at least one skewed slot; the metal front end of the pull ring being provided in the upper cover, the metal front end of the pull ring being coupled to the limiting post, at least one boss of the metal front end being abutted against the at least one skewed slot; the metal front end being able to slide along the limiting post in the upper cover, driving the at least one boss to slide into the at least one skewed slot and then hide into a bottom of the at least one skewed slot, or abut against at least one inclined surface of the at least one skewed slot and then bulge.

In an embodiment of the present disclosure, the optical module further comprises a light guide column which is disposed on the base and serves as an alarm indicator of the optical module.

In an embodiment of the present disclosure, the light guide column includes a light guide strip and a cylinder provided with a hemisphere at an end, the cylinder is aligned with a light emitting element in the optical module, and the hemisphere is used for converging light from the light emitting element.

In an embodiment of the present disclosure, the optical module further comprises a circuit board and an optical cable both coupled each other and provided in the base.

In an embodiment of the present disclosure, pins on the optical cable are inserted into a lens adapter of the circuit board to convert photoelectric signals.

In an embodiment of the present disclosure, the optical module further comprises a fixture block which is stuck between the base and the pins on the optical cable.

In the present disclosure, the boss is provided on the metal front end of the pull ring and abuts against the skewed slot of the upper cover, and the metal front end can slide relative to the upper cover along the limiting post of the upper cover and drive at least one boss to slide into the skewed slot of the upper cover and hide into the bottom of the skewed slot or abut against the inclined surface of the at least one skewed slot and bulge. When the at least one boss abuts against the bevel edge of the at least one skewed slot and then bulges, a spring strip of a shielding cage to be cooperated with the boss is pushed upwards and opened, and the optical module can be unlocked. Compared with the reduction of the reliability of the optical module in the priority art due to the key parts adopting plastic parts, even the failure of unlocking the optical module caused by the breakage of the plastic parts, the reliability of the optical module unlocking device provided by the present disclosure is high and the unlocking motion of the optical module is simple, and the optical module unlocking device of the present disclosure has the advantages of less component quantities, simple assembling, high assembling efficiency and low cost.

In addition, the optical module of the present disclosure is also provided with a light guide column serving as an alarm indicator of the optical module to prompt the user whether the current working state of the optical module is abnormal, which is convenient for the user to monitor the working state of the optical module.

BRIEF DESCRIPTION OF THE DRAWINGS

In order to explain the technical solution of the embodiment of the present disclosure more clearly, the drawings used in the embodiment of the present disclosure will be briefly introduced below. Obviously, the drawings described below are just some embodiments of the present disclosure, and for those of ordinary skill in the art, other drawings can be obtained based on these drawings without inventive labor.

DETAILED DESCRIPTION

In order to make the object, technical solutions, and advantages of the present disclosure clearer, the present disclosure will be described in further detail below with reference to the drawings and embodiments. It should be understood that the specific embodiments described herein are only used to explain, not to limit the present disclosure.

In the description of the present disclosure, the orientations or positional relationships indicated by the terms "inner", "outer", "longitudinal", "transverse", "upper", "lower", "top", "bottom" and the like based on the orientations or positional relationships shown in the drawings, which are only for convenience of description of the present disclosure and not for requiring the present disclosure to be constructed and operated in a specific orientation, and therefore should not be understood as a limitation on the present disclosure.

In addition, the technical features involved in various embodiments of the present disclosure described below can be combined with each other as long as they do not conflict with each other.

Embodiment 1

Embodiment 1 of the present disclosure provides an optical module unlocking device, comprising a pull ring and an upper cover.

The upper cover has a limiting post and at least one skewed slot.

A metal front end of the pull ring is provided on the upper cover and is coupled with the limiting post, and at least one boss of the metal front end abuts against the at least one skewed slot.

The metal front end located in the upper cover can slide with respect to the upper cover along the limiting post, and drive the at least one boss to slide into the at least one skewed slot and then hide into a bottom of the at least one skewed slot or abut against a bevel edge of the at least one skewed slot and then bulge.

The upper cover of the optical module unlocking device according to the embodiment 1 of the present disclosure is provided with a limiting post and at least one skewed slot. The metal front end of the pull ring is provided in the upper cover and coupled with the limiting post of the upper cover. The at least one boss of the metal front end abuts against the at least one skewed slot. When the at least one boss of the metal front end slides into the bottom of the at least one skewed slot, the optical module unlocking device is in a locking position; when the at least one boss of the metal front end abuts against the bevel edge of the at least one skewed slot and then bulges, a spring strip of a shielding cage which is about to be cooperated with the boss is pushed upwards and opened by the bulged boss, and the optical module can be unlocked. The reliability of the metalized optical module unlocking device provided by the present disclosure is high and the unlocking motion of the optical module is simple. The optical module unlocking device has many advantages, such as less component quantities, simple assembling, high assembling efficiency and low cost.

The optical module unlocking device according to embodiment 1 of the present disclosure will be described below with reference to FIG. 1 to FIG. 13.

Figure 1:
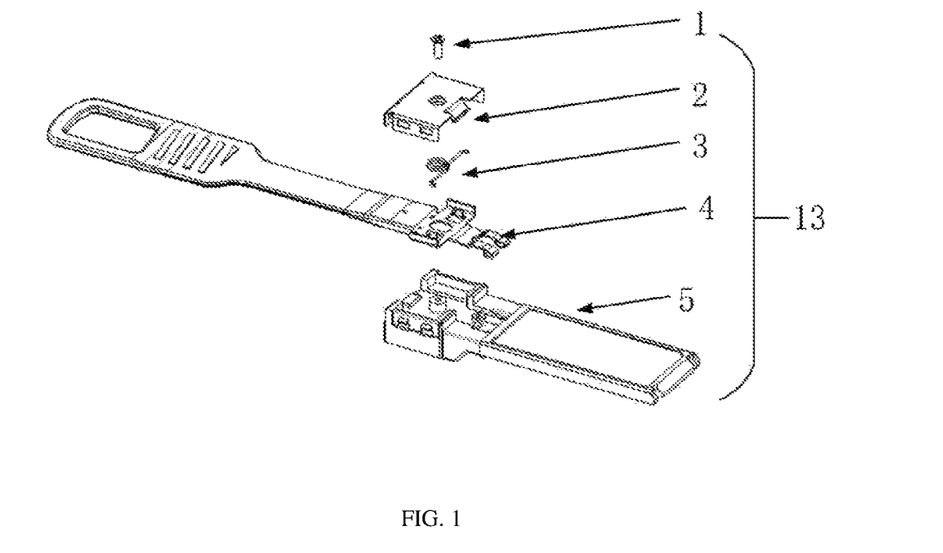
FIG. 1 is an exploded view of an optical module unlocking device according to an embodiment 1 of the present disclosure.
Figure 2:
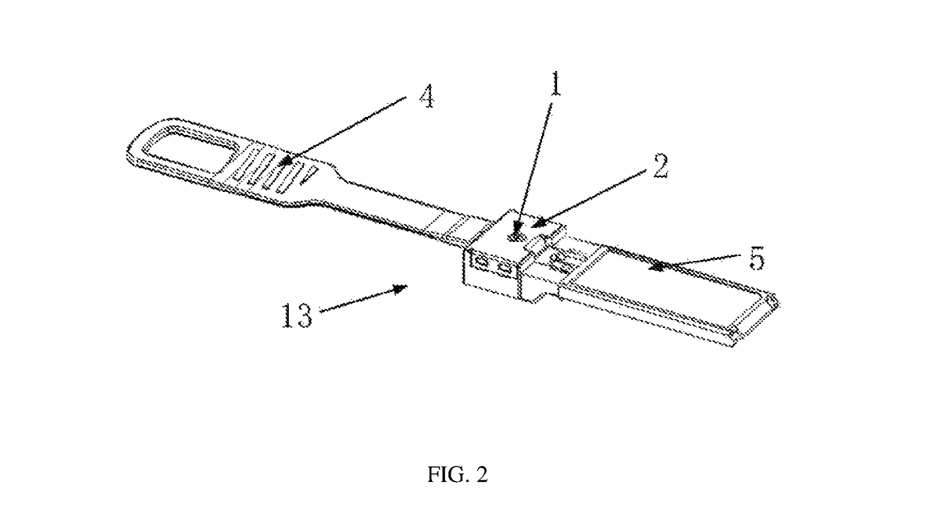
FIG. 2 is an assembling diagram of an optical module unlocking device according to an embodiment 1 of the present disclosure.

In combination with the embodiment 1 of the present disclosure, and with reference to FIG. 1 and FIG. 2, the optical module unlocking device 13 includes a pull ring 4 and an upper cover 5. In an actual application scenario, the optical module unlocking device 13 is assembled in an optical module having a circuit board, and the optical module is locked in a shielding cage to realize optical interconnection; when the optical module needs to be removed from the shielding cage (e.g. circuit board failure), the optical module can be removed from the shielding cage to be unlocked by means of the pull ring 4 of the optical module unlocking device 13.

In combination with embodiment 1 of the present disclosure, and with reference to FIG. 3 to FIG. 6, the following is to describe the structures of the pull ring 4 and the upper cover 5, and the position or connection relationship between the pull ring 4 and the upper cover 5.

Figure 3:
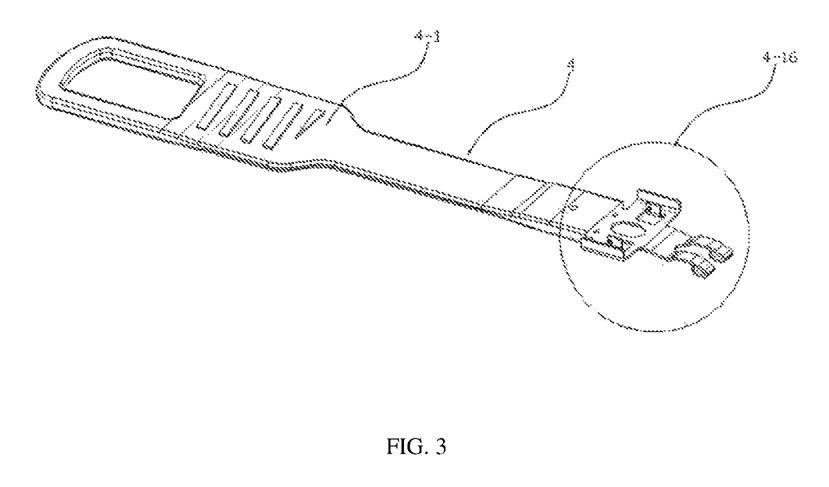
FIG. 3 is a perspective view of a pull ring of an optical module unlocking device according to an embodiment 1 of the present disclosure.
Figure 4:
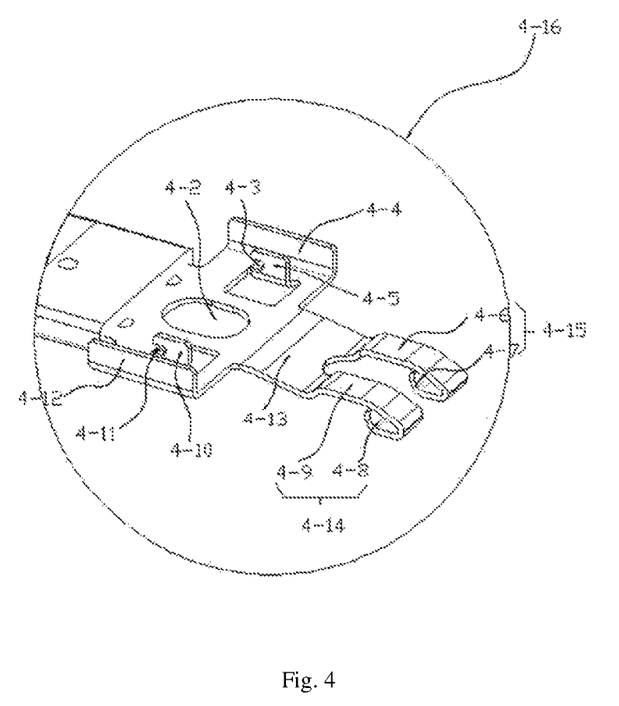
FIG. 4 is an enlarged diagram of a metal front end of the pull ring from the optical module unlocking device of FIG. 3.

The pull ring 4 includes a pull ring handle 4-1 and a metal front end 4-16. The metal front end 4-16 includes at least one boss 4-14, 4-15, each of which includes an unlocking arm and a bump. Taken the boss 4-14 as an example, the boss 4-14 includes an unlocking arm 4-9 and a bump 4-8. The bump 4-8 may be a hollow bump formed after bending metal sheet, or may be a solid bump. The first unlocking arm 4-6 and the second unlocking arm 4-9 are symmetrically arranged. The first unlocking arm 4-6 is connected with the first bump 4-7, and the second unlocking arm 4-9 is connected with the second bump 4-8. The metal front end 4-16 is also provided with an oval hole 4-2 which is coupled with the limiting post 5-1 of the upper cover 5. In a preferred implementation, the metal front end 4-16 of the pull ring 4 is a metal sheet which is processed by sheet metal stamping, and the pull ring handle 4-1 is a plastic handle and is connected the metal front end 4-16 together through a manner of secondary injection molding. Of course, the pull ring handle 4-1 and the metal front end 4-16 may also be integrally formed from a metal sheet. The plastic pull ring handle 4-1 is convenient for pulling by the users and avoids cutting fingers by metal sheets.

Figure 5:
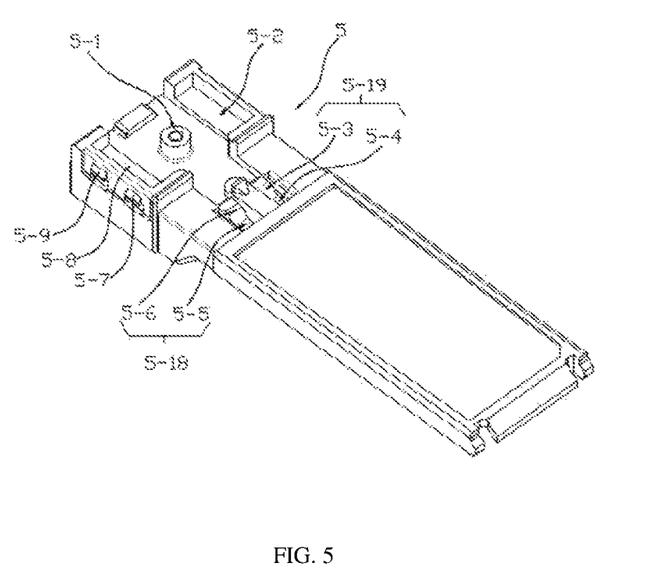
FIG. 5 is a perspective view 1 of an upper cover of the optical module unlocking device according to an embodiment 1 of the present disclosure.
Figure 6:
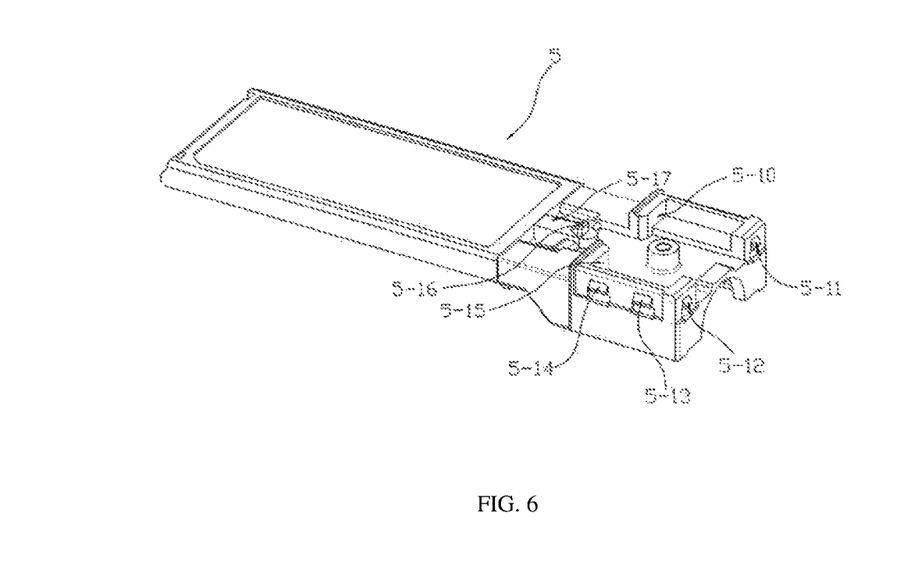
FIG. 6 is a perspective view 2 of an upper cover of the optical module unlocking device according to an embodiment 1 of the present disclosure.
Figure 7:
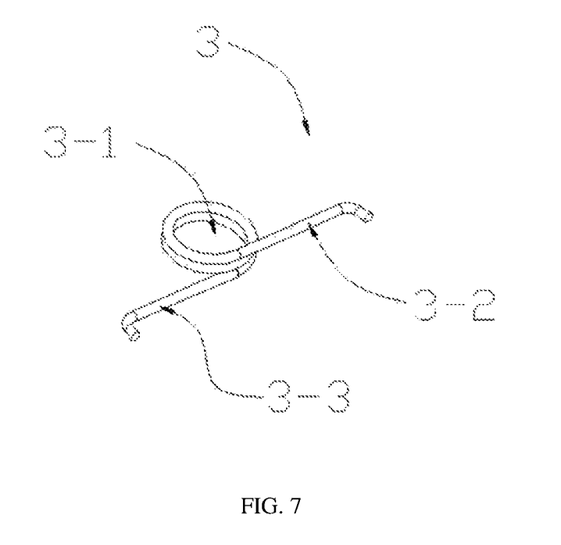
FIG. 7 is a perspective view of a torsion spring of an optical module unlocking device according to an embodiment 1 of the present disclosure.

The upper cover 5 is a rectangular shell. The upper cover 5 further includes at least one skewed slot 5-18, 5-19, the number of which is the same as that of the at least one boss 4-14, 4-15. Each skewed slot is composed of a groove and an inclined plane. Taken the skewed slot 5-18 as an example, the skewed slot 5-18 includes a groove 5-5 and an inclined plane 5-6. The metal front end 4-16 located in the upper cover 5 can slide relatively within the length range of the oval hole 4-2 along the limiting post 5-1, and drive the at least one boss 4-14, 4-15 to slide into the at least one skewed slot 5-18, 5-19. When at least one boss 4-14, 4-15 slides into the bottom of the at least one skewed slot 5-18, 5-19, the optical module is in a locked position; when the at least one boss 4-14, 4-15 abuts against the at least one bevel edge 5-3, 5-6 of the at least one skewed slot 5-18, 5-19 and then bulges, a spring strip of a shielding cage is pushed upwards and opened by the unlocking arm 4-6, 4-9 of the at least one boss 4-14, 4-15, and the unlocking of the optical module is realized. The upper cover 5 further includes a first platform 5-2 and a second platform 5-8 which are right-and-left symmetrically arranged in the width direction. The limiting post 5-1 is provided between the first platform 5-2 and the second platform 5-8, and is coupled with the oval hole 4-2 of the metal front end 4-16, thus, the metal front end 4-16 can be moved back and forth along the oval hole 4-2. One end of the first platform 5-2 is provided with a first stopping surface 5-15, and one end of the second platform 5-8 is provided with a second blocking surface 5-10. The outside of the first stopping surface 5-15 is provided with a first skewed slot 5-19, and the outside of the second stopping surface 5-10 is provided with a second skewed slot 5-18. The first skewed slot 5-19 and the second skewed slot 5-18 are symmetrically arranged. The first skewed slot 5-19 includes a first inclined surface 5-3 and a first groove 5-4, and the second skewed slot 5-18 includes a second inclined surface 5-6 and a second groove 5-5.

In the embodiment 1 of the present disclosure, it is described that each of the number of the bosses and the number of the skewed slots is two. However, the number of the bosses and the skewed slots in the embodiment 1 of the present disclosure is not limited to two, and the improvements made by those skilled in the art in the number of bosses and skewed slots still fall within the protection scope of the present disclosure.

With reference to embodiment 1 of the present disclosure, there is another implementation for coupling the metal front end 4-16 of the pull ring 4 with the upper cover 5. Specifically, the metal front end 4-16 of the pull ring 4 is provided with a recessed limiting post, the upper cover 5 is provided with an oval through hole or an oval counterbore which is matched with the recessed limiting post of the metal front end 4-16, and the width of the oval through hole or the oval counterbore is matched with that of the recessed limiting post of the metal front end 4-16 so that the limiting post of the metal front end 4-16 of the pull ring 4 can slide relatively along the oval through hole or an oval counterbore of the upper cover 5. Compared with the manufacture of the recessed limiting post in the pull ring 4 and oval through hole or oval counterbore in the upper cover 5, the manufacture of the oval hole 4-2 and the limit post 5-1 is simpler and more convenient. The above two coupling manners between the metal front end 4-16 and the upper cover 5 are both fall within the protection scope of the present disclosure.

With reference to the embodiment 1 of the present disclosure, in order to reliably position the metal front end 4-16 of the pull ring 4 on the upper cover 5 to prevent the pull ring 4 from falling off, an internal thread may be provided in the limiting post 5-1 of the upper cover 5, and a screw is screwed into the limiting post 5-1, wherein the width of the screwhead of the screw is greater than the width of the oval hole 4-2 in the metal front end 4-16, therefore, the metal front end 4-16 of the pull ring 4 can be limited to be prevented from falling off from the upper cover 5.

Figure 8:
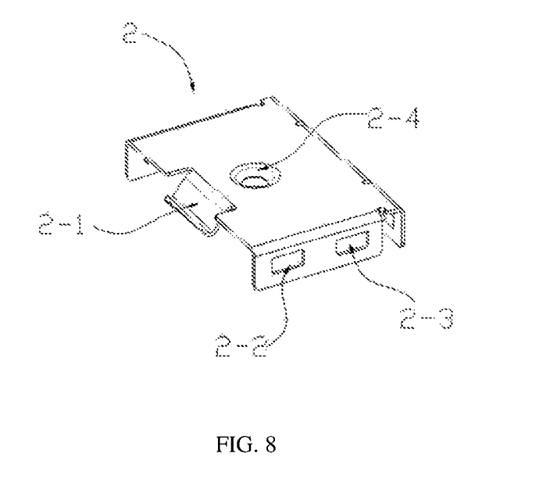
FIG. 8 is a perspective view 1 of a snap-in cover of an optical module unlocking device according to an embodiment 1 of the present disclosure.
Figure 9:
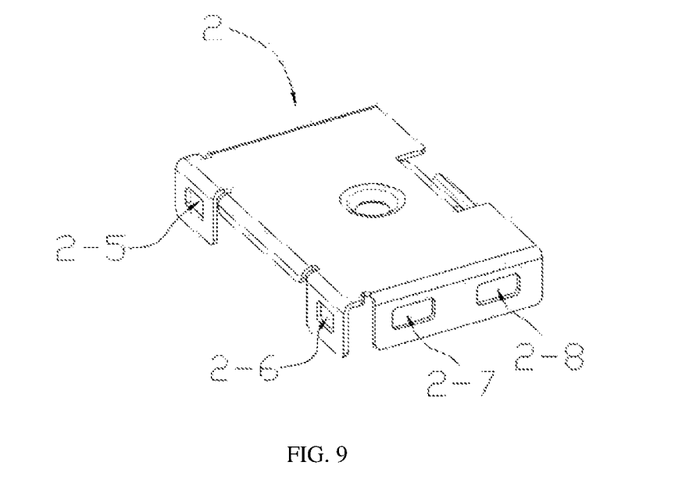
FIG. 9 is a perspective view 2 of a snap-in cover of an optical module unlocking device according to an embodiment 1 of the present disclosure.

In combination with the embodiment 1 of the present disclosure, and with reference to FIG. 8 and FIG. 9, the optical module unlocking device 13 further includes a snap-in cover 2, which, on the one hand, is used for positioning and limiting the metal front end 4-16 of the pull ring 4, and, on the other hand, is used for waterproofing and dust-proofing for the optical module. In order to fix the snap-in cover 2 to the upper cover 5, the snap-in cover 2 includes at least one catching nut 2-2, 2-3, 2-5, 2-6, 2-7, 2-8. Specifically, the snap-in cover 2 is provided with a tab 2-1 at one of its ends, and are symmetrically provided with a first catching nut 2-3, a second catching nut 2-2, a third catching nut 2-7, and a fourth catching nut 2-8 at its both sides, and is provided with a fifth catching nut 2-5 and a sixth catching nut 2-6 at the other end opposite to the tab 2-1. The upper cover 5 includes at least one sticking point 5-7, 5-9, 5-11, 5-12, 5-13, 5-14. Specifically, the both sides of one end where the upper cover 5 is coupled with the metal front end 4-16 are each provided with two sticking points: the first sticking point 5-13 and the third sticking point 5-9 are symmetrically arranged, and the second sticking point 5-14 and the fourth sticking point 5-7 are symmetrically arranged, the same side provided the first sticking point 5-13, the second sticking point 5-14, the third sticking point 5-9, and the fourth sticking point 5-7 are provided with the fifth sticking point 5-12 and the sixth sticking point 5-11. The number of the at least one sticking point 5-7, 5-9, 5-11, 5-12, 5-13, 5-14 is consistent with the number of the at least one catching nut 2-2, 2-3, 2-5, 2-6, 2-7, 2-8. A plurality of catching nuts of the snap-in cover 2 are stuck into a plurality of sticking points of the upper cover 5, i.e. the first catching nut 2-3, the second catching nut 2-2, the third catching nut 2-7, the fourth catching nut 2-8, the fifth catching nut 2-5 and the sixth catching nut 2-6 of the snap-in cover 2 are respectively cooperated with the first sticking point 5-13, the second sticking point 5-14, the third sticking point 5-9, the fourth sticking point 5-7, the fifth sticking point 5-12 and the sixth sticking point 5-11 of the upper cover 5, so that the positioning of the snap-in cover 2 and the catching nut 5 can be realized. Furthermore, in order to better realize the reliable connection between the snap-in cover 2 and the upper cover 5, a taper hole 2-4 is provided in the snap-in cover 2, and an internal thread is provided in the limiting post 5-1 of the upper cover 5, thus the screw is passed through the taper hole 2-4 of the snap-in cover 2 and is in threaded connection with the limiting post 5-1 of the upper cover 5, and the reliable connection between the snap-in cover 2 and the upper cover 5 can be realized. In other implementations, a plurality of sticking points may also be provided on the snap-in cover 2, and a plurality of catching nuts may be provided in the upper cover 5. Although the positions of the plurality of sticking points and the plurality of catching nuts are changed, the positioning of the snap-in cover 2 and the upper cover 5 can also be achieved. In the present implementation, each of the number of the at least one catching nut 2-2, 2-3, 2-5, 2-6, 2-7, 2-8 and the number of the at least one sticking point 5-7, 5-9, 5-11, 5-12, 5-13, 5-14 is six, of course, it can also be two, three, four, or five, as long as it can be realized that the reliable positioning of the snap-in cover being on the snap-in cover. Any improvement made by those skilled in the art in the number of catching nuts belongs to the protection scope of the present disclosure. In an alternative embodiment, the snap-in cover 2 is a thin-walled shell with an elastic structure, and is processed by a sheet metal working manner.

In order to limit the two bosses 4-14, 4-15 of the metal front end 4-16, referring to FIG. 10 to FIG. 13, the snap-in cover 2 is also provided with a tab 2-1, which is used for limiting the bulge positions of the two bosses 4-14, 4-15. The metal front end 4-16 of the pull ring 4 is located between the upper cover 5 and the snap-in cover 2, and the tab 2-1 presses the connecting arm 4-13 of the metal front 4-16, in turn, the connecting arm 4-13 is located between the oval hole 4-2 of the metal front end 4-16 and the two bosses 4-14, 4-15. When the two bosses 4-14, 4-15 respectively abut against the two bevel edges 5-3, 5-6 of the two skewed slots 5-18, 5-19 and then bulge, the tab 2-1 abuts against the connecting arm 4-13 to limit the bulge positions of the two bosses 4-14, 4-15. After a spring strip 14-1 of a shielding cage 14 is pushed upwards and opened by the two bosses 4-14, 4-15 so that the optical module unlocking device 13 is unlocked, the two bosses 4-14, 4-15 are reset under the action of the tab 2-1, and hidden into the bottom of the two skewed slots 5-18, 5-19.

With reference to the embodiment 1 of the present disclosure, in order to realize the quick reset of the metal front end 4-16 of the pull ring 4 after the unlocking of the optical module unlocking device 13 is completed, in a preferred embodiment, the optical module unlocking device according to the embodiment 1 of the present disclosure is further provided with a torsion spring 3 to realize the quick reset of the metal front end 4-16 of the pull ring 4 under the action of the torsion of the torsion spring 3. Referring to FIG. 1 to FIG. 7, the torsion spring 3 includes an annular ring 3-1 and two L-shaped arms 3-2, 3-3, preferably, the torsion spring 3 is an elastic part formed by bending steel wires; the metal front end 4-16 further includes a first vertical arm 4-5 and a second vertical arm 4-10 which are symmetrically arranged, wherein the first vertical arm 4-5 is provided with a first U-shaped hole 4-3, the second vertical arm 4-10 is provided with a second U-shaped hole 4-11, and a first stopping arm 4-4 and a second stopping arm 4-12 are right-and-left symmetrically provided outside the first vertical arm 4-5 and the second vertical arm 4-10. The annular ring 3-1 of the torsion spring 3 passes through the limiting post 5-1 of the upper cover 5, and the first L-shaped arm 3-2 and the second L-shaped arm 3-3 stick into the first U-shaped hole 4-3 and the second U-shaped hole 4-11 of the metal front end 4-16, respectively, so that, under the action of the torsion of the torsion spring 3, the first stopping arm 4-4 and the second stopping arm 4-12 of the metal front end 4-16 press against the first stopping surface 5-15 and the second stopping surface 5-10 of the upper cover 5. When the first boss 4-14 and the second boss 4-15 of the metal front end 4-16 respectively abut against the first bevel edge 5-6 and the second bevel edge 5-3 and then bulge, the optical module unlocking device 13 completes unlocking, at this time, the optical module is taken out from the shielding cage. Then, under the action of the elastic force of the torsion spring 3, the first boss 4-14 and the second boss 4-15 respectively slide into the first skewed slot 5-18 and the second skewed slot 5-19, and then hide into the bottom of the first skewed slot 5-18 and the bottom of the second skewed slot 5-19 to realize the automatic reset of the metal front end 4-16 of the pull ring 4.

With reference to the embodiment 1 of the present disclosure, the installation steps of the optical module unlocking module 13 of the present disclosure will be described by taking the optical module unlocking device 13 including the screw 1, the snap-in cover 2, the torsion spring 3, the pull ring 4 and the upper cover 5 as examples.

Firstly, placing the first stopping arm 4-4 and the second stopping arm 4-12 of the metal front end 4-16 of the pull ring 4 on the first platform 5-2 and the second platform 5-8 of the upper cover 5, respectively; passing the oval hole 4-2 of the metal front end 4-16 of the pull ring 4 through the limiting post 5-1 of the upper cover 5; and placing the first bump 4-7 and the second bump 4-8 of the metal front end 4-16 in the first groove 5-4 and the second groove 5-5 of the upper cover 5.

Secondly, passing the annular ring 3-1 of the torsion spring 3 through the limiting post 5-1 of the upper cover 5, and respectively sticking the first L-shaped arm 3-2 and the second L-shaped arm 3-3 into the first U-shaped hole 4-3 and the second U-shaped hole 4-11 of the metal front end 4-16, then, under the action of the torsion of the torsion spring 3, pressing the first stopping arm 4-4 and the second stopping arm 4-12 of the metal front end 4-16 against the first stopping surface 5-15 and the second stopping surface 5-10 of the upper cover 5.

Finally, placing the snap-in cover 2 on the upper cover 5 from top to bottom, and respectively cooperating the first catching nut 2-3, the second catching nut 2-2, the third catching nut 2-7, the fourth catching nut 2-8, the fifth catching nut 2-5 and the sixth catching nut 2-6 of the snap-in cover 2 with the first sticking point 5-13, the second sticking point 5-14, the third sticking point 5-9, the fourth sticking point 5-7, the fifth sticking point 5-12 and the sixth sticking point 5-11 of the upper cover 5; locating the taper hole 2-4 of the cover 2 above the limiting post 5-1 of the upper cover 5, and fixing the snap-in cover 2 on the upper cover 5 through screw 1 for the limiting post 5-1 is made with internal thread; pressing the tab 2-1 of the snap-in cover 2 against the connecting arm 4-13 of the metal front end 4-16. The assembly of the optical module unlocking device is completed now.

In combination with the embodiment 1 of the present disclosure, with reference to FIG. 10 to FIG. 13, it is to describe the unlocking process of the optical module unlocking device 13 according to the embodiment 1 of the present disclosure.

Figure 10:
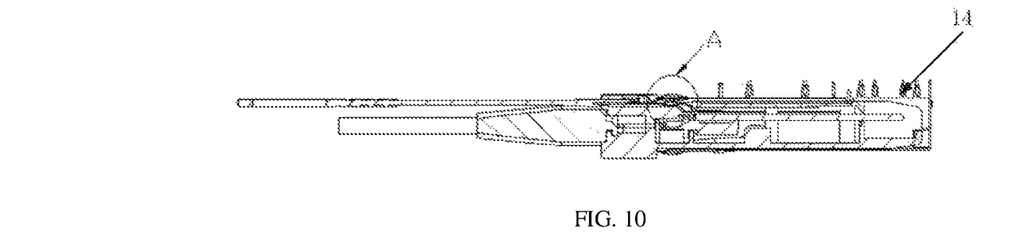
FIG. 10 is a plan view of an unlocking device of an optical module according to an embodiment 1 of the present disclosure at its initial position.
Figure 11:
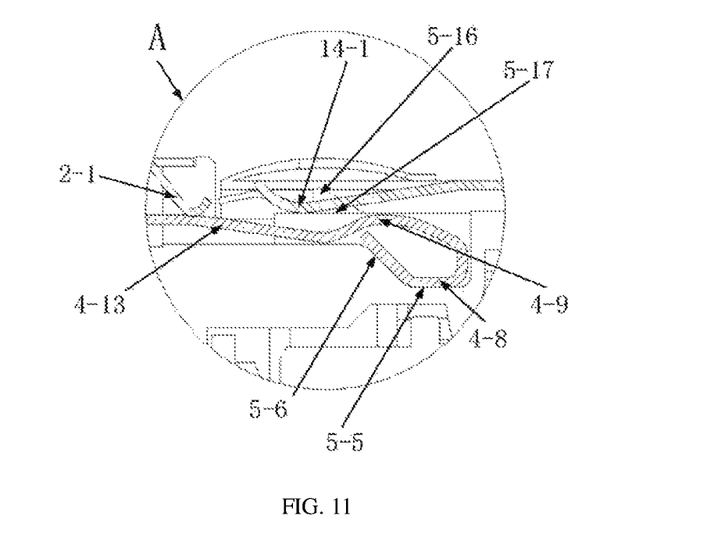
FIG. 11 is an enlarged view of the plan view of the unlocking device of the optical module in FIG. 10 at its initial position.

FIG. 10 and FIG. 11 show the locking position of the optical module located in the locking position in the shielding cage 14, taking the second boss 4-14 and the second skewed slot 5-18 as an example. The tab 2-1 of the snap-in cover 2 abuts against the connecting arm 4-13 of the metal front end 4-16, and the second boss 4-14 is located in the second skewed slot 5-18, i.e. the second bump 4-8 is hid into the bottom of the second groove 5-5. When the second unlocking arm 4-9 is located below the lower surface 5-17 of the projection 5-16, the optical module is in the locking position in the shielding cage 14.

Figure 12:
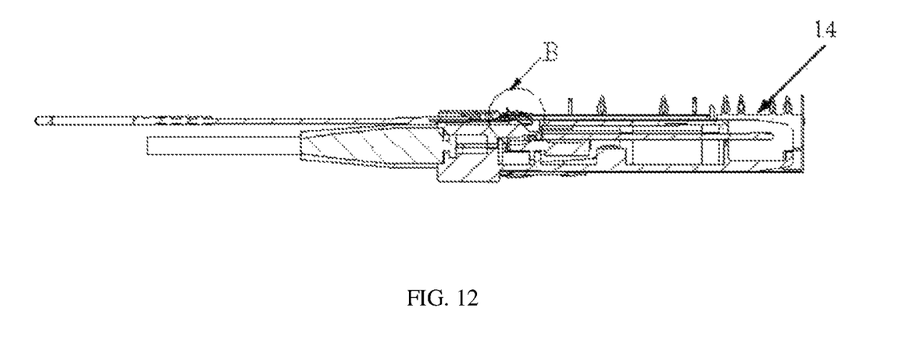
FIG. 12 is a plan view of an unlocking device of an optical module according to an embodiment 1 of the present disclosure at its unlocked position.
Figure 13:
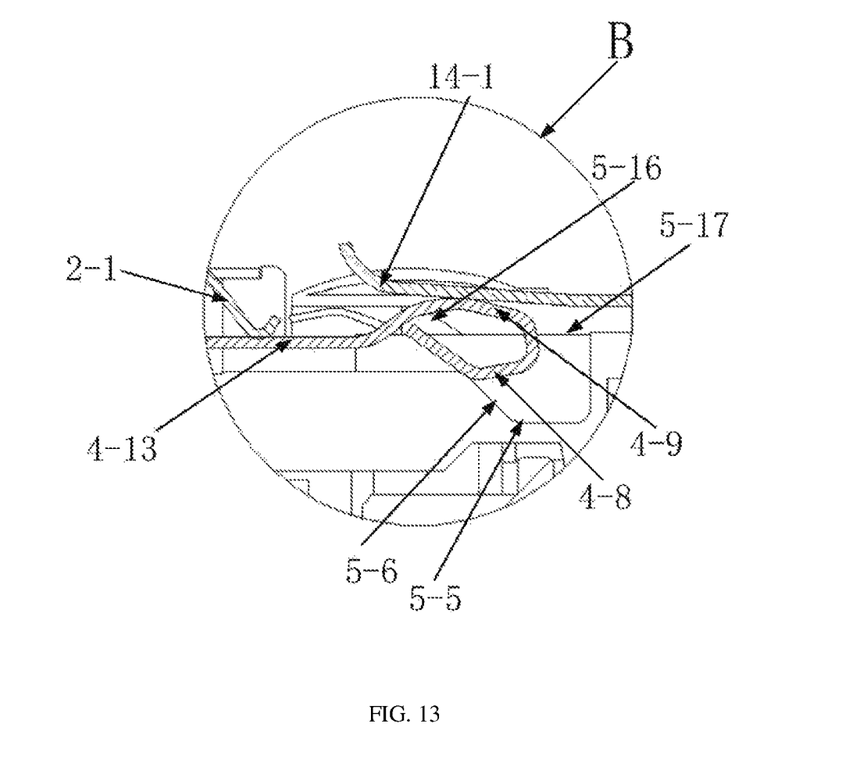
FIG. 13 is an enlarged view of the plan view of the unlocking device of the optical module in FIG. 12 at its unlocked position.

FIG. 12 and FIG. 13 show the position of the moment when the optical module is unlocked from the shielding cage 14, taking the second boss 4-14 and the second skewed slot 5-18 as an example. When the pull ring handle 4-1 moves leftwards in the direction shown in the figures, the metal front end 4-16 are guided to move leftwards along the limiting post 5-1, and the second bump 4-8 of the second boss 4-14 abuts against the second inclined surface 5-6 of the second skewed slot 5-18 and moves towards the upper left, and when the upward bulge height of the second unlocking arm 4-9 is higher than the height of the upper surface of the projection 5-16 of the upper cover 5, the spring strip 14-1 of the shielding cage 14 which is contacted with the second unlocking arm 4-9 is pushed upwards and opened, such that the purpose of pulling the optical module unlocking device 13 to unlock the optical module from the shielding cage 14 is realized. When the optical module is completely removed from the shielding cage 14, the connecting arm 4-13 moves downwards to reset under the action of the tab 2-1, and the metal front end 4-16 of the pull ring 4 moves rightwards along the limiting post 5-1 under the action of the elastic force of the torsion spring 3, so that the second boss 4-14 slides into the second skewed slot 5-18 and hides into the bottom of the second skewed slot 5-18, so that the pull ring 4 of the optical module unlocking device 13 is reset in order to insert into the shielding cage 14 next time. In the present implementation, even if the optical module unlocking device 13 does not include the torsion spring 3 and the snap-in cover 2, the unlocking of the optical module and the resetting of the pull ring 4 can also be realized, however, when the pull ring 4 is reset, an external force is needed to push the pull ring 4 to move rightwards, so that the second boss 4-14 is hid into the bottom of the second skewed slot 5-18.

Embodiment 2

Figure 14:
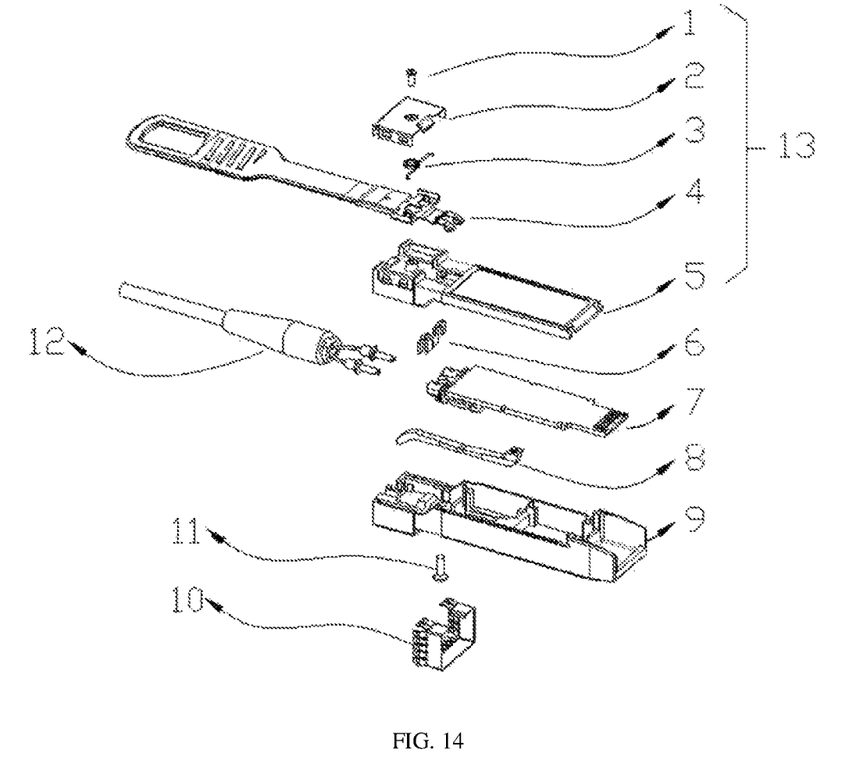
FIG. 14 is an exploded diagram of an optical module according to an embodiment 2 of the present disclosure.
Figure 15:
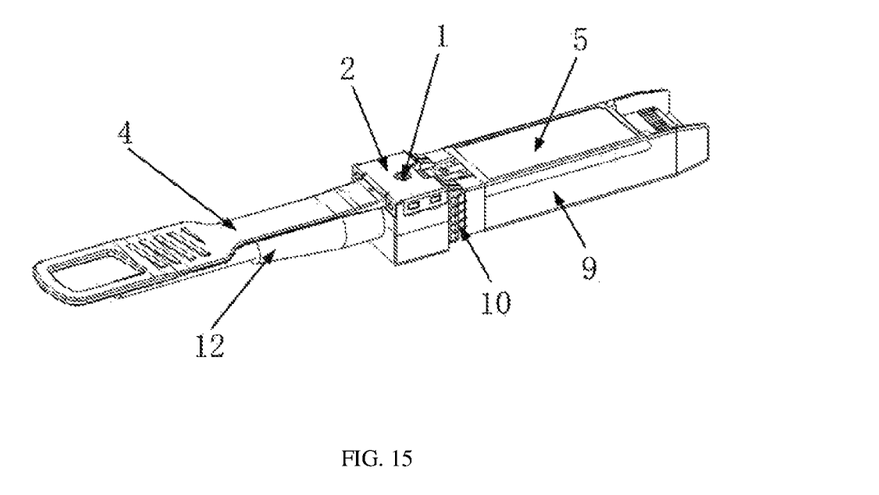
FIG. 15 is an assembling diagram 1 of an optical module according to an embodiment 2 of the present disclosure.
Figure 16:
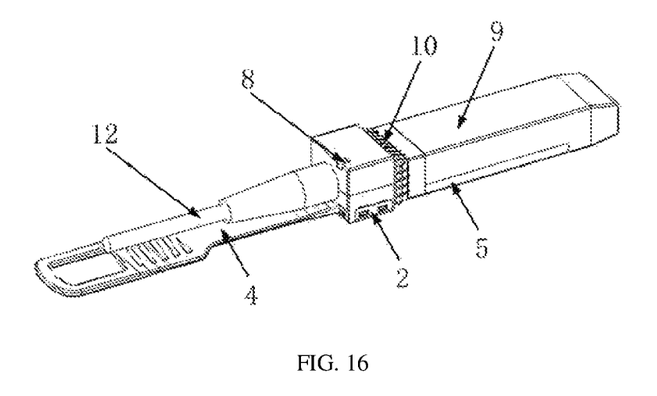
FIG. 16 is an assembling diagram 2 of an optical module according to an embodiment 2 of the present disclosure.

Embodiment 2 of the present disclosure provides an optical module, as shown in FIG. 14 to FIG. 16, which includes the optical module unlocking device 13 according to the embodiment 1 of the present disclosure, a circuit board 7, a light guide column 8, a base 9, an optical module spring strip 10, and an optical cable 12.

The circuit board 7 is coupled with the optical cable 12 and is provided in the base 9.

The light guide column 8 is provided on the base 9 and serves as an alarm indicator of the optical module.

The optical module unlocking device 13 is coupled with the base 9.

The optical module spring strip 10 is provided on an assembly of the optical module unlocking device 13 and the base 9.

In the optical module according to the embodiment 2 of the present disclosure, the light guide column is provided on the base and serves as an alarm indicator of the optical module to prompt the user whether the current working state of the optical module is abnormal, which is convenient for the user to monitor the working state of the optical module.

Figure 17:
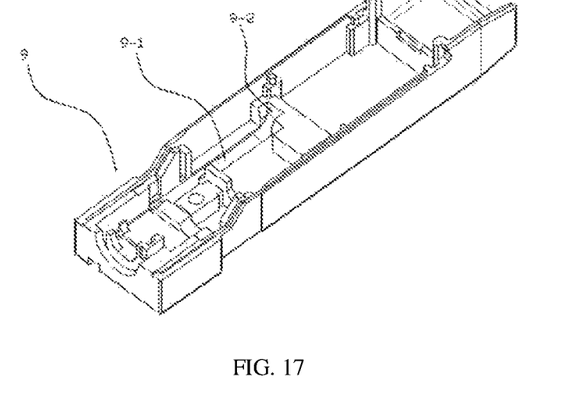
FIG. 17 is a perspective view 1 of a base of an optical module according to an embodiment 2 of the present disclosure.
Figure 18:
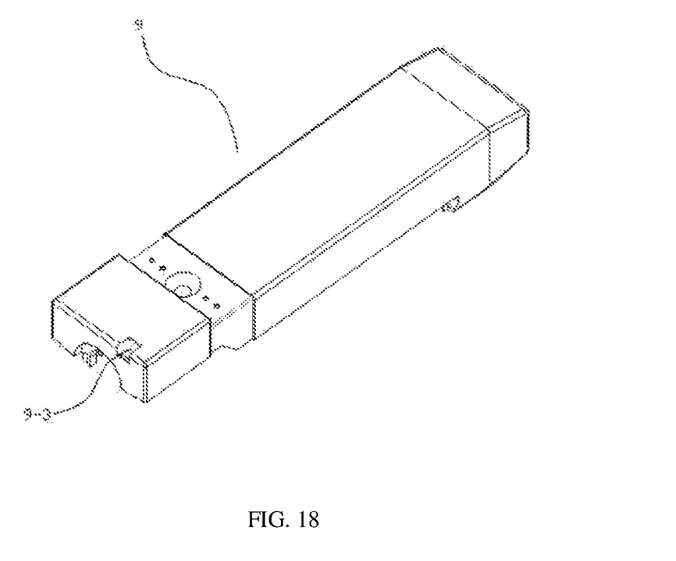
FIG. 18 is a perspective view 2 of a base of an optical module according to an embodiment 2 of the present disclosure.
Figure 19:
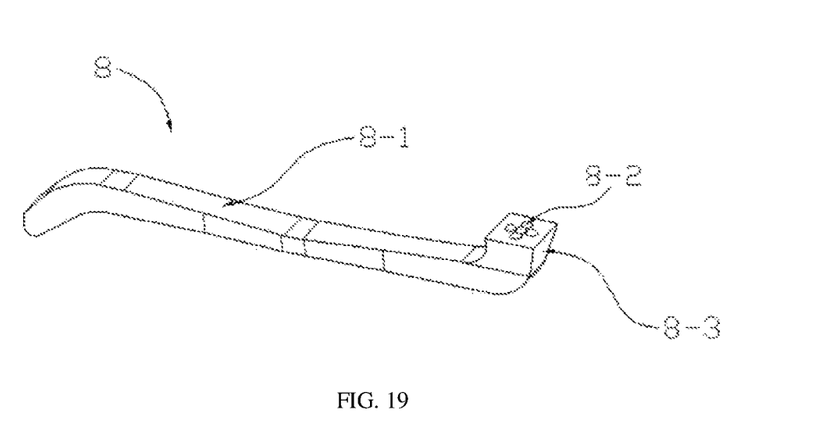
FIG. 19 is a perspective view of a light guide column of an optical module according to an embodiment 2 of the present disclosure.

With reference to the embodiment 2 of the present disclosure, in order to check whether the working state of the optical module is abnormal, the light guide column 8 is provided in the optical module. With reference to FIG. 17 to FIG. 19, the light guide column 8 includes a light guide strip 8-1, wherein an end of the light guide strip 8-1 is provided with a tapered column 8-3, and a bottom surface of the tapered column 8-3 is provided with a hemisphere 8-2; the base 9 includes a dead slot 9-1, one end of which is provided with a light through hole 9-3, and the other end of which is provided with a locating slot 9-2. The light guide column 8 is placed into the dead slot 9-1 of the base 9, wherein one end of the light guide strip 8-1 extends out of the light through hole 9-3 of the base 9, and the tapered column 8-3 at the other end of the light guide strip 8 is limited by the locating slot 9-2 of the base 9. The tapered column 8-3 of the light guide column 8 is aligned with a light emitting element on the circuit board 7, and the hemisphere 8-2 on the tapered column 8-3 plays a role of converging light from the light emitting element. The light guide column 8 serves as an alarm indicator of the optical module, and is used to prompt the user whether the current working state of the optical module is abnormal, for example, when the temperature, voltage, or optical power of the circuit board 7 exceeds standard, the light guide column 8 will emit light, prompting the user that the current temperature, voltage, or optical power index of the optical module is abnormal. Of course, it is also possible that the light guide column 8 emits light to alert the user when other index is abnormal, such as current, which is not further limited here. In a preferred embodiment, the light guide column 8 is an elongated strip that can guide light, and the light guide column 8 realizes its own light emission by guiding light.

The installation process of the optical module of the present disclosure will be described with reference to the embodiment 2 of the present disclosure:

Placing the light guide column 8 into the base 9; inserting the pins on the optical cable 12 into the lens adapter of the circuit board 7 to realize the conversion of the photoelectric signals, optionally, the circuit board 7 is a printed circuit board assembly PCBA (Printed Circuit Board Assembly, abbreviated as PCBA); placing the optical cable 12 and the circuit board 7 both into the base 9, and aligning the tapered column 8-3 of the light guide column 8 with the light emitting element on the circuit board 7; sticking the fixture block 6 between the base 9 and the pins on the optical cable 12; placing the optical module unlocking device 13 on an assembly of the base 9 from top to bottom; passing the screw 11 through the base 9 and screwing it into the upper cover 5; and installing the optical module spring strip 10 in the assembly of the optical module unlocking device 13 and the base 9.

The above description is only the preferred embodiments of the present disclosure, and is not intended to limit the present disclosure, and any modification, equivalent replacement, and improvement made within the spirit and principle of the present disclosure shall be included within the protection scope of the present disclosure.

What is claimed is:

1. An optical module unlocking device, comprising:
a pull ring having a front metal end, the front metal end being provided with at least one boss, and
an upper cover having a limiting post and at least one skewed slot,
the metal front end of the pull ring being arranged in the upper cover and being coupled to the limiting post, and the at least one boss of the metal front end being abutted against the at least one skewed slot; and
the metal front end being able to slide in the upper cover along the limiting post, driving the at least one boss to slide into the at least one skewed slot and then hide into a bottom of the at least one skewed slot, or abut against at least one bevel edge of the at least one skewed slot and then bulge,
wherein the optical module unlocking device further comprises a torsion spring having an annular ring and two L-shaped arms; the pull ring further includes two vertical arms each provided with a U-shaped hole, and the upper cover further includes two stopping surfaces; and
wherein the annular ring is coupled to the limiting post of the upper cover, the two L-shaped arms respectively pass through the corresponding U-shaped holes of the vertical arms, and the two vertical arms respectively abut against the two stopping surfaces.

2. The optical module unlocking device of claim 1, wherein the at least one boss of the metal front end each includes at least one unlocking arm and at least one bump, the skewed slot includes at least one groove, a number of the at least one groove being consistent with those of the at least one bump and the at least one unlocking arm; and
when the at least one boss hides into the bottom of the at least one skewed slot, the at least one bump is coupled with the at least one groove of the skewed slot.

3. The optical module unlocking device of claim 2, wherein when a bulge height of the at least one boss after abutting against the bulge edge of the at least skewed slot and then bulging is higher than a certain height, the optical module unlocking device is unlocked.

4. The optical module unlocking device of claim 3, wherein when a bulge height of the at least one boss after abutting against the bulge edge of the at least skewed slot and bulging is higher than a height of an upper surface of the projection of the upper cover, the optical module unlocking device is unlocked.

5. The optical module unlocking device of claim 4, wherein when the at least one unlocking arm is below a height of a lower surface of the projection of the upper cover, the optical module unlocking device is locked.

6. The optical module unlocking device of claim 1, wherein the optical module unlocking device further comprises a snap-in cover; and
the upper cover further includes at least one sticking point, the snap-in cover includes at least one catching nut which is coupled to the at least one sticking point and matches the at least one sticking point in number.

7. The optical module unlocking device of claim 6, wherein the snap-in cover is further provided with a through-hole, via which the snap-in cover is connected with the limiting post by a threaded connection.

8. The optical module unlocking device of claim 1, wherein the optical module unlocking device further comprises a snap-in cover, the snap-in cover is provided with a through-hole, via which the snap-in cover is coupled with the limiting post by a threaded connection.

9. The optical module unlocking device of claim 6, wherein the snap-in cover is further provided with a tab which abuts against a connecting arm of the pull ring connecting the at least one boss.

10. The optical module unlocking device of claim 1, wherein the upper cover further comprises two platforms, and the metal front end is provided with two stopping arms which are respectively coupled to the platforms.

11. The optical module unlocking device of claim 1, wherein the metal front end is provided with an oval hole coupled with the limiting post, and the metal front end may slide along a length direction of the oval hole.

12. The optical module unlocking device of claim 11, wherein a width of the oval hole is the same as that of the limiting post.

13. The optical module unlocking device of claim 1, wherein
the pull ring further includes two stopping arms respectively provided on outsides of the two vertical arms,
and the two stopping arms respectively abut against the two stopping surfaces.

14. An optical module, comprising
a base,
an optical module unlocking device coupled to the base, and
an optical module spring strip disposed on an assembly of the optical module unlocking device and the base;
wherein the optical module unlocking device includes
a pull ring having a metal front end, the metal front end being provided with at least one boss, and
an upper cover having a limiting post and at least one skewed slot,
the metal front end of the pull ring being provided in the upper cover and being coupled to the limiting post, and the at least one boss of the metal front end being abutted against the at least one skewed slot;
the metal front end being able to slide relatively along the limiting post in the upper cover, driving the at least one boss to slide into the at least one skewed slot and then hide into a bottom of the at least one skewed slot, or abut against at least one bevel edge of the at least one skewed slot and then bulge,
wherein the optical module unlocking device further comprises a torsion spring having an annular ring and two L-shaped arms; the pull ring further includes two vertical arms each provided with a U-shaped hole, and the upper cover further includes two stopping surfaces; and
wherein the annular ring is coupled to the limiting post of the upper cover, the two L-shaped arms respectively pass through the corresponding U-shaped holes of the vertical arms, and the two vertical arms respectively abut against the two stopping surfaces.

15. The optical module of claim 14, wherein the optical module further comprises a light guide column disposed on the base (9), serving as an alarm indicator of the optical module.

16. The optical module of claim 15, wherein the light guide column includes a light guide strip and a cylinder provided with a hemisphere at an end, the cylinder is aligned with a light emitting element in the optical module, and the hemisphere is used for converging light from the light emitting element.

17. The optical module of claim 14, further comprising a circuit board and an optical cable both coupled each other and provided in the base.

18. The optical module of claim 17, wherein pins on the optical cable are inserted into a lens adapter of the circuit board to convert photoelectric signals.

19. The optical module of claim 18, wherein the optical module further comprises a fixture block which is clamped between the base and the pins on the optical cable.

* * * * *